United States Patent [19] [11] 4,049,402
Fortson [45] Sept. 20, 1977

[54] GAS MIXING DEVICE

[75] Inventor: Charles B. Fortson, Panama City, Fla.

[73] Assignee: The United States of America as represented by the Secretary of the Navy, Washington, D.C.

[21] Appl. No.: 629,730

[22] Filed: Nov. 6, 1975

[51] Int. Cl.[2] .............................................. B01D 19/00
[52] U.S. Cl. .......................................... 55/208; 55/68; 55/257 R; 55/271; 128/145 R; 128/191 R; 261/82; 261/DIG. 48
[58] Field of Search ....................... 55/21, 68, 39, 257, 55/271, 208; 128/145, 191; 261/82, DIG. 48

[56] References Cited

U.S. PATENT DOCUMENTS

| | | | |
|---|---|---|---|
| 1,056,244 | 3/1913 | Wiley | 55/68 |
| 1,706,707 | 3/1929 | Reilly et al. | 55/68 |
| 3,690,040 | 9/1972 | Halfon | 55/68 |
| 3,720,501 | 3/1973 | Cramer et al. | 128/191 R |
| 3,729,138 | 4/1973 | Tysk | 261/DIG. 48 |

*Primary Examiner*—Bernard Nozick
*Attorney, Agent, or Firm*—Richard S. Sciascia; Don D. Doty; Harvey A. David

[57] ABSTRACT

Method and apparatus for mixing hydrogen and oxygen as a noncombustionable mixture of gases which avoids the hazard of a combustible mixing interface are disclosed as comprising a pair of cylinders which timely contains a water solvent within which said hydrogen and oxygen are respectively dissolved under pressurized and refrigerated conditions, in accordance with a predetermined program of operations. Then, the gas-saturated water of one of said cylinders is mixed with that of the other, thereby causing the gases therein to be mixed wthin the mixed water. The resultant gaseous mixture is subsequently separated from said water mixture, dried, and stores as a mixture of hydrogen and oxygen gases.

4 Claims, 3 Drawing Figures

GAS MIXING DEVICE

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention is, in general, related to gas mixers, and is, in particular, a method and means for mixing hydrogen and oxygen in such manner that the explosion or fire hazard while so doing is minimized. In even greater particularity, the subject invention comprises a method and apparatus for safely mixing hydrogen and oxygen together in such proportions that it may be used as a swimmer and diver breathing gas.

DESCRIPTION OF THE PRIOR ART

Heretofore, insofar as it is known, hydrogen and oxygen have been mixed directly as gases. However, such procedure leaves something to be desired, because the mixing interface thereof usually contains combustible ratios of the two gases, thereby providing a possible fire hazard under certain circumstances.

SUMMARY OF THE INVENTION

In the instant invention, hydrogen ($H_2$) and oxygen ($O_2$) are mixed while dissolved, under pressure, in water. Once the desired ratio or proportions of hydrogen and oxygen are so mixed, the mixture thereof is driven out of the water by the addition of heat thereto and the reduction of pressure thereon at substantially the same time. As the gaseous mixture is so driven out of the water, tiny bubbles thereof form and rise to and through the surface of the water and accumulate thereabove due to their buoyancy. Of course, as they rise, they will grow, due to their being subjected to reduced hydrostatic pressure, and due to their being merged with neighboring bubbles. The mixing process —that is, the mixing of $H_2$ and $O_2$—will take place within the gaseous bubbles, thereby yielding a maximum surface area of water per given volume of gas mixture, the latter of which can then be pumped to and stored for subsequent use as desired.

It is, therefore, an object of this invention to provide an improved method and means for mixing a plurality of mixable gases.

Another object of this invention is to provide an improved method and means for mixing a plurality of water-soluble gases.

Still another object of this invention is to provide an improved method and means for mixing hydrogen and oxygen gases in predetermined proportions.

A further object of this invention is to provide an improved method and means for mixing hydrogen and oxygen and other gases with minimum hazard of explosion and/or fire.

Another object of this invention is to provide a method and system for safely manufacturing swimmer-diver breathing gases when the resulting mixture thereof comprises combustible ratios of the individual gases.

Still another object of this invention is to provide an improved method and apparatus for manufacturing a substantially pure mixture of hydrogen and oxygen of predetermined proportions with safety and efficiency.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
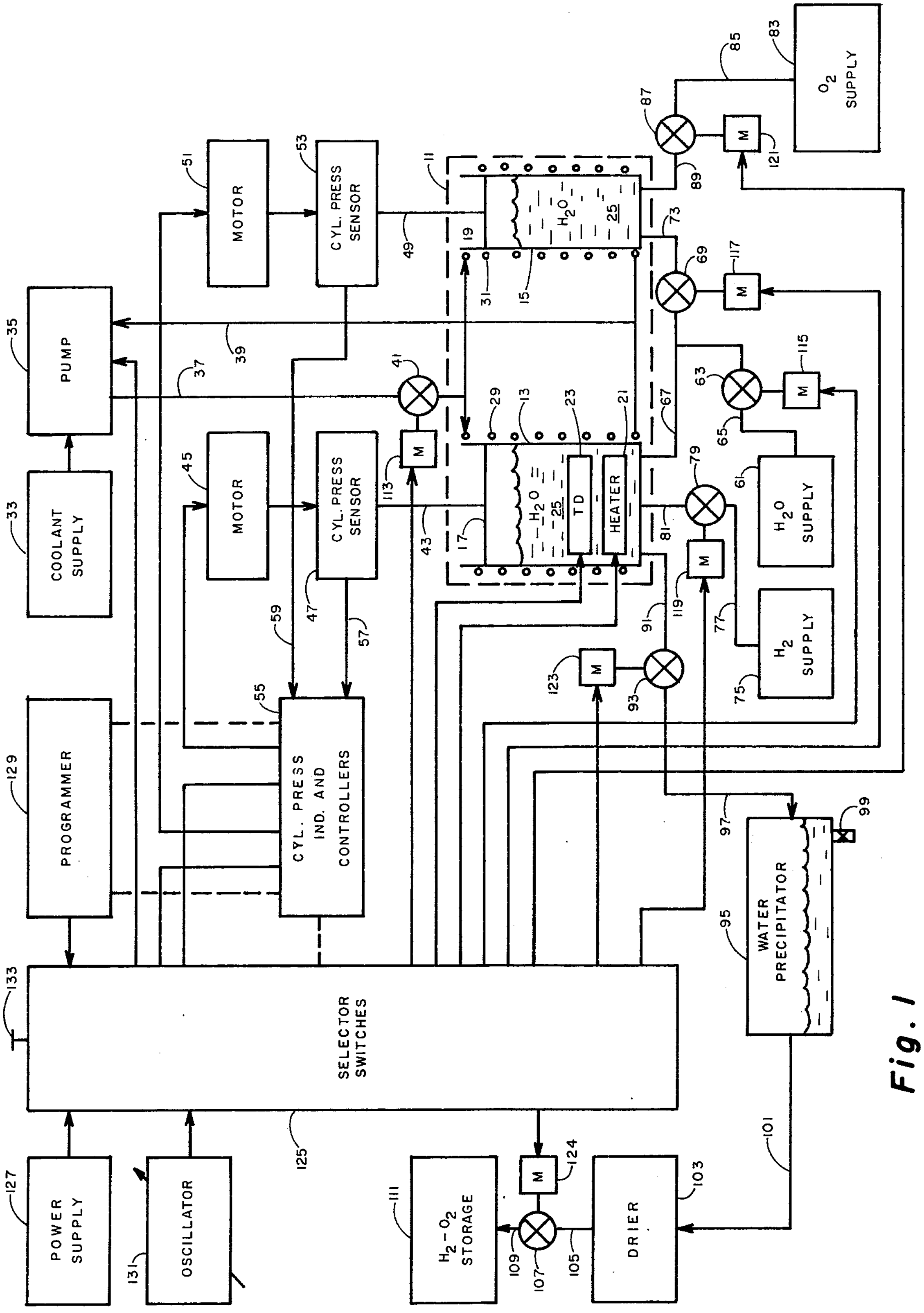
FIG. 1 is a combination block and schematic diagram of the system constituting the subject invention.

Referring now to FIG. 1, there is shown a hydrogen and oxygen mixer 11 which comprises a hydrogen cylinder 13 and an oxygen cylinder 15, the former of which has a slidable piston 17 therewithin, and the latter of which has a slidable piston 19 therewithin, as is conventional in most cylinder-piston arrangements. In other words, although cylinder13 and piston 17 and cylinder 15 and piston 19 are shown schematically, it should be understood that the contacting surfaces occurring respectively therebetween are slidably sealed in some convenient manner, say, as by piston rings (not shown) or the like. Hence, the movements of said pistons can change the pressures within said cylinders, depending upon their respective positions therein.

Disposed in clyinder 13 is a heater 21, and an electro-acoustical transducer 23. Although shown as being near the bottom of cylinder 13 (for convenience of disclosure purposes), said heater 21 and transducer 23 may be located in any convenient place therewithin or in conjunction therewith, such as, for example, external thereto, but in such manner as would generate heat and acoustical energy inside cylinder 13 without disturbing or preventing the proper motion of piston 17.

Also disposed in cylinders 13 and 15 is pure or distilled water 25, the respective amounts of which will be discussed more fully subsequently during the explanation of the operation of the invention.

It would also perhaps be noteworthy at this time that, although water is the preferred fluid employed as the operative gas solvent in cylinders 13 and 15, any other fluid or liquid that is suitable therefor may be used instead. As a matter of fact, the solvent used for such purpose may be contingent upon the gases being mixed—which, likewise, may be any mixable gases—and, thus, be something other than water, if the circumstances so warrant. Nevertheless, in this preferred embodiment of the invention the solvent is pure water and the solute gases are hydrogen ($H_2$) and Oxygen ($O_2$). Obviously, it would be well within the purview of the artisan having the benefit of the teachings presented herewith to select whatever fluid would be best as the aforesaid solvent and whatever gases would be best for the aforementioned gases for any given operational circumstances.

A substantially helical shaped cooling coil 29 surrounds cylinder 13, through which water or some other coolant flows; and another substantially helical shaped cooling coil 31 is similarly disposed around cylinder 15, through which the same coolant preferably flows. Of course, the purpose of both of said coolant coils is to maintain cylinders 13 and 15 at some predetermined optimum temperature, which would facilitate the disolving of hydrogen and oxygen in the water contained therein, respectively. Obviously, other coolant means—such as, for instance, an appropriate refrigeration system—may be used for the purpose of cooling cylinders 13 and 15. Moreover, it may readily be appreciated that cylinders 13 and 15 may be so constructed and insulated as necessary to be insulated from their ambient environments and each other.

For the purpose of supplying said coolant to the aforesaid coolant coils 29 and 31, a coolant supply (say, some conventional refrigerant) 33 has its output connected to the input of a pump 35, the output and input pipes 37 and 39 of which are effectively connected to the entrances and to the exits of coils 29 and 31, respectively. In this particular instance, said coils 29 and 31 are connected in fluid parallel; however, they may also be connected in fluid series, or any other way desired. But, as may readily be seen in FIG. 1, output pipe 37 is connected to a motor driven valve 41.

The aforementioned piston 17 is timely moved up and down within cylinder 13 by means of a connecting rod 43 effectively connected between it and a reversible drive motor 45. For the convenience of disclosure, a cylinder pressure sensor 47 is shown, in block form, as being inserted in connecting rod 43, but it should be understood that the pressure within cylinder 13 may be sensed in any desired manner without violating the scope of the invention. For example, connecting rod 43 may be hollow, the hollow of which connects to a hole through piston 17, and cylinder pressure sensor 47 may be inserted through the wall of said connecting rod 43, so as to be inserted in the hollow thereof, thereby being effectively exposed to the pressure within cylinder 13 at all times.

Like the aforementioned piston 17, piston 19 is effectively driven through a connecting rod 49 by a reversible drive motor 51; and like the aforementioned cylinder pressure sensor 47, a cylinder pressure sensor 53 is connected to connecting rod 49 in such manner as to effectively sense the pressure in cylinder 15 at all times.

One or more cylinder pressure indicators and controllers 55—which may include, switches, recorders, or other readouts—are connected to the outputs of cylinder pressure sensors 47 and 53 by means of pipes 57 and 59, respectively.

A water supply 61 has its output connected to a motor driven valve 63 by means of a pipe 65, and the output of valve 63 is connected to one of the inputs of cylinder 13 by means of a pipe 67 and to the input of another motor driven valve 69 by means of pipe 71, with the output of valve 69 connected by means of a pipe 73 to one of the inputs of cylinder 15.

A hydrogen ($H_2$) supply 75 has its output connected by means of pipe 77 to the input of a motor driven valve 79, the output of which is connected to another input of cylinder 13 by means of a pipe 81.

An oxygen ($O_2$) supply 83 is connected by means of a pipe 85 to the input of a motor driven valve 87, the output of which is connected by means of another pipe 89 to the other input of cylinder 15.

Another pipe 91 is connected between an output of cylinder 13 and the input of a motor driven valve 93, with the output thereof connected to the input of a water precipitator 95 by means of a pipe 97.

At this time, it would perhaps be noteworthy that water precipitator 95 is preferably of a conventional commercially available type having a drain 99 therein; on the other hand, it may have the water reservoir portion thereof connected to the aforesaid water supply 61 in such manner—by means of a pipe and other apparatus, not shown—that the water that accumulates in the former is timely or automatically drained into the latter, without loss of the gas pressure within said water precipitator 95. Here, again, the artisan would be able to make such design selections, if he had the benefit of the above teachings.

The output of water precipitator 95 is, by means of a pipe 101, connected to the input of a gas drier 103, the output of which is connected by means of a pipe 105 to the input of a motor driven valve 107, the output of which is, in turn, connected by means of a pipe 109 to the input of a hydrogen oxygen ($H_{2-O2}$) storage 111.

This ostensively completes the structural description of the mechanical portion of the invention; therefore, most of the remaining portion of the invention now to be described is of an electrical nature or pertains thereto.

In order to more clearly define all of the aforementioned motor driven valves, it should perhaps be stated that valves 41, 63, 69, 79, 87, 93, and 107 are reversible in such manner that they be opened and closed by reversible motors 113, 115, 117, 119, 121, 123, and 124, respectively.

The electrical inputs of each of said valve motors 113 through 124 are connected to outputs of a plurality of selector switches, herewith designated as selector switches 125, respectively. One of the electrical inputs thereof is connected to a suitable electrical power supply 127. Of course, each of said valve motors is properly energized—so as to timely open and close their respective valves—through its individual switch, the other terminal of which is selectively connected to a suitable positive or negative voltage of said power supply 127. Selector switches 125 are preferably conventional relay switches, but may be any other suitable type or types desired.

A programmer 129 is connected to an input of selector switches 125 and, in fact, is connected thereto in such manner that each and every one thereof is properly and timely opened and closed thereby.

An oscillator 131 is connected through one of the switches of selector switches 125 to the input of the aforementioned electroacoustical transducer 23.

A number of the switches of selector switches 125 are respectively electrically connected to the energization and/or actuation inputs of the following elements: pump 35, heater 21, and valve motors 113, 115, 117, 119, 121, 123, and 124. As will be discussed more fully below, each of said switches are designed to connect the aforesaid pump, heater, and valve motors to the proper voltage polarity supplied by power supply 127 in accordance with a predetermined actuation program set in programmer 129. In other words, programmer 129 (or an optional manual adjustment 133) causes the selector switches of switches 125 and the switches of controllers 55 to be opened and closed in such sequence that the internal operations of the various and sundry elements of the invention perform their functions in such manner as to produce the method steps necessary for the safe mixing of hydrogen and oxygen by mixer 11 and the storing of the resultant gaseous mixture in $H_2 - O_2$ storage 111, from which it may be drawn for any appropriate use whatsoever.

Because cylinder pressure indicators and controllers 55 perform control functions with respect to motors 45 and 51, the control portions thereof should be designed to include a pair of normally closed switches which are caused to be opened whenever the pressure in clyinders 13 and 15 reach a high predetermined pressure, as sensed by cylinder pressure sensors 47 and 53. Of course, if so desired, the cylinder pressure control aspect of the invention may be performed manually, rather than automatically, merely by operating the aforesaid switches manually, either directly or indirectly through adjustment 133 in conjunction with switches 125.

Figure 2:
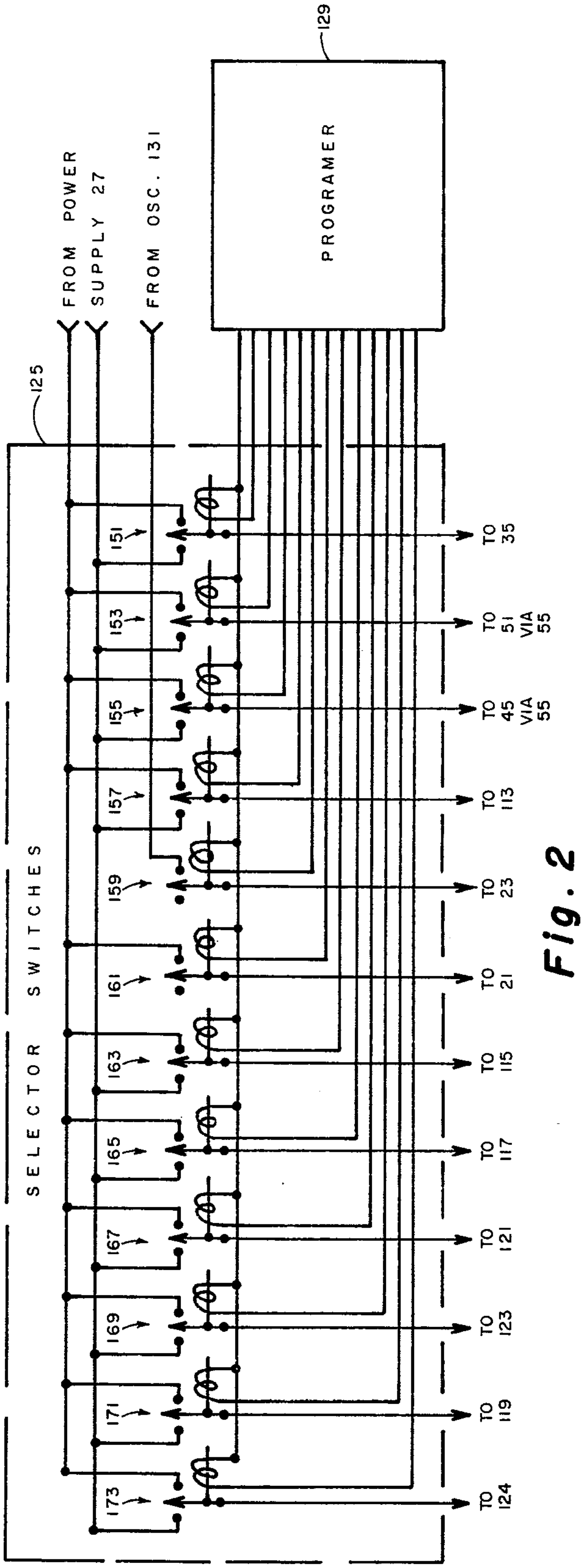
FIG. 2 depicts representative selector switches that may be used as selector switches 125 in FIG. 1.

Referring now to FIG. 2, there is shown a representative embodiment of a plurality of selector relay switches 151 through 172 which may be employed as the aforementioned selector switches 125 of the system of FIG. 1. Although in this particular instance, switches 151 through 173 are disclosed as double pole-single throw relay switches, they may be any other type of switches—including mechanically operated switches—if so desired. Moreover, they may be so constructed as to be manually operated per se or electrically, mechanically, or manually operated via programmer 129. Obviously, it would be well within the purview of one skilled in the art having the benefit of the teachings presented herewith to select whatever design for either switches 124 or programmer 129 as would provide optimum performance during any given operational circumstances.

Obviously, as disclosed, said relay switches 151 through 173 should be designed to contact either of the poles thereof, respectively, merely be reversing the polarities of the voltage supplied thereto by programmer 129; and, in addition, one of the poles thereof should preferably be connected to the positive voltage of power supply 27, while the other of the poles thereof should be connected to the negative voltage of power supply 27, so that the reversible motors to which they are respectively connected may be run in whatever direction is necessary to open and close the valves connected thereto or properly actuate the other components connected thereto, respectively.

It would perhaps be noteworthy at this time that switches 159 and 161 are merely connected to be on-off switches, because they are only used to connect oscillator 131 to transducer 23 and power supply 27 to heater 21 in a timely manner, respectively.

Figure 3:
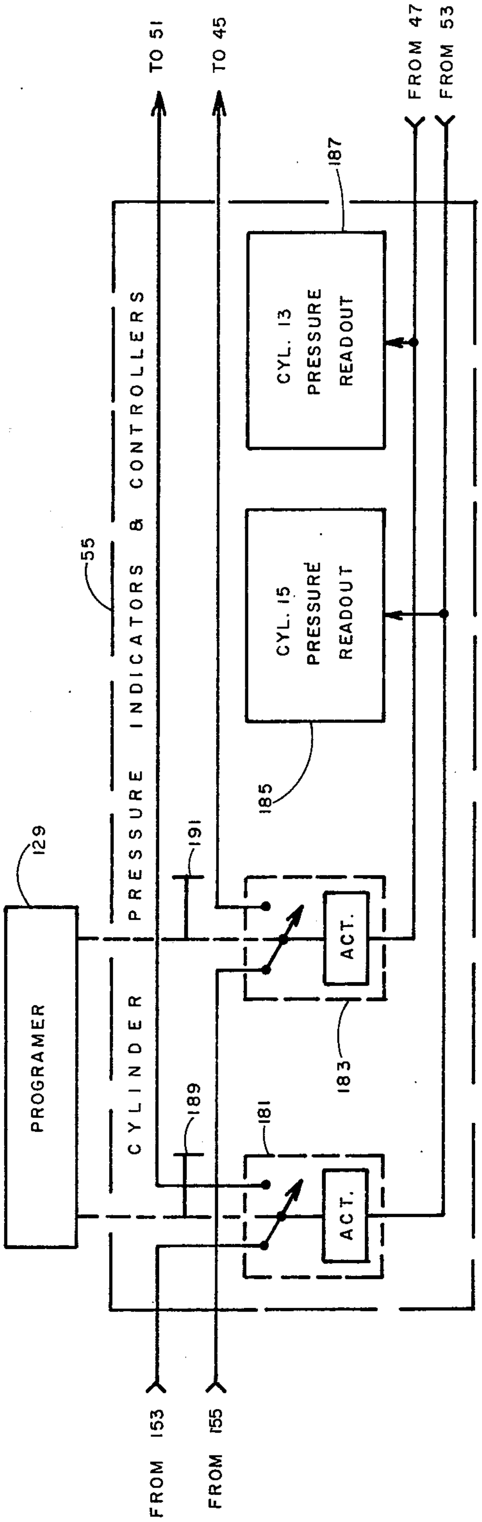
FIG. 3 illustrates representative cylinder pressure indicators and controls that may be used as cylinder pressure indicator and controls 55 in the embodiment of FIG. 1.

Without any limitation intended, FIG. 3 represents a typical construction which may be used for cylinder pressure indicator and controllers 55.

A pair of pressure actuated switches 181 and 183 are respectively connected between the output of switch 153 of selector switches 125 and the input of reversible piston drive motor 51, and between the output of switch 155 of selector switches 125 and the input of a reversible piston drive motor 45. Also, readouts 185 and 187 readout the pressures in cylinders 15 and 13, inasmuch as, like the pressure actuators of switches 183 and 181, they are connected to cylinder pressure sensors 47 and 53, respectively.

In this particular case, switches 181 and 183 are connected to programmer 129 for the purpose of overriding their pressure actuation, either manually or pursuant to any given program, if such becomes necessary or desirable. In the alternative, they may be respectively operated manually by adjustments 189 and 191, if so desired.

Although discussed elsewhere, for purpose of emphasis, programmer 129 is programmed in any conventional manner that will cause it to produce the operational steps disclosed subsequently during the discussion of the operation of the invention. Of course, such steps are effected by means of properly and timely manipulating relay switches 151 through 173 and, perhaps, pressure actuated switches 181 and 183.

Obviously, all of the elements and components shown in FIG. 1, either schematically or in block form, are well known, conventional, and commercially available. Hence, it should be understood that it is the new and unique interconnections and interactions that produce the new combination of elements constituting the subject invention and the improved results effected thereby.

MODE OF OPERATION

The operation of the invention will now be discussed briefly in conjunction with all of the figures of the drawing.

In order to set the stage, so to speak, for the operation of the invention, it should ostensively be understood at the outset that numerous different proportions of hydrogen and oxygen (and other gases, too) may be mixed with relative safety in the invention. However, in this particular discussion, it will be considered that the proportions used are such that the resulting mixture could be use satisfactorily as breathing gas for swimmers and divers. In such case, for instance, and without limitation, 96% hydrogen would be mixed with 4% oxygen, in accordance with the following sequence on steps of operation effectively implemented by programmer 129:

1. The operation should be begun with motors 45 and 51 actuated in such manner that pistons 17 and 19 are located at the bottoms of their respective cylinders 13 and 15; and motor 117 is actuated in such manner that valve 69 is open, with all of the other valves being in a closed condition.
2. Motor 115 is then actuated and valve 63 is caused to be opened.
3. Motors 45 and 51 are then actuated in such manner as to cause pistons 17 and 19 to be moved upwardly, thereby causing water to be drawn into cylinders 13 and 15.
4. Actuate motors 115 and 117 to effect closure of valves 63 and 69.
5. Actuate motors 119 and 121 effecting the opening of valves 79 and 87.
6. Actuate motors 45 and 51, thereby causing pistons 17 and 19 to move up and admit the required volumes of $H_2$ and $O_2$ into cylinders 13 and 15, respectively.
7. Actuate motors 119 and 121 to cause valves 79 and 87 to be closed.
8. Actuate motor 113 to open valve 41.
9. Start pump 35, so as to cause the circulation of coolant 33 through cooling coils 29 and 31.
10. Actuate motors 45 and 51 in such manner as to cause pistons 17 and 19 to be slowly moved downward, so as to reduce the volumes in cylinders 13 and 15. They should be moved until there is a sudden increase in clyinder pressure, caused by pistons 17 and 19 hitting the surface of the water. At this time said motors 45 and 51 are stopped by controllers 55 and programmer 129 and the $H_2$ and $O_2$ have been disolved in and, thus, are in solution in said water.
11. Actuate motor 117 to effect the opening of valve 69 (which releases pressure in cylinders 13 and 19 enough to cause the switches in controllers 55 to close and thereby make programmer 129 in control again).

12. Actuate motors 51 and 45 to move piston 19 down and piston 17 up in such manner as to cause the water to be transferred from clyinder 15 to cylinder 13 while said pistons are maintained in contact with the water surfaces in their respective cylinders.

13. Stop pump 35.

14. Actuate motor 113 to effect closure of valve 41.

15. Energize heater 21.

16. Energize electroacoustical transducer 23.

17. Actuate motor 45 to cause piston 17 to move to the top of its stroke, thereby allowing gas mixture evolution to occur in cylinder 13.

18. Turn heater 21 off.

19. Turn transducer 23 off.

20. Actuate motors 123 and 124, so as to cause valves 93 and 107 to be opened.

21. Actuate motor 45 to cause piston 17 to be moved to the bottom of cylinder 13, thereby moving the water and gas mixture to water precipitator 95, when the gas will be separated from the water and forced on to be dried in drier 103, and, in turn, continue on for storage in $H_{2-O2}$ storage 111.

22. Actuate motors 123 and 124, so as to close valves 93 and 107.

23. Repeat the aforementioned process steps 1 through 22, if an additional quantity of $H_2$ and $O_2$ gaseous mixture is desired.

Although the foregoing process is preferred, it is entirely possible that hydrogen and oxygen (and, of course, other gases, too) could be mixed by means of manually manipulating various ones of the elements of the device of FIG. 1, if so desired. However, so doing would not result in the efficiency that is capable of being obtained as a result of using the entire system of FIG. 1.

In any event, it may readily be seen that the method and means for mixing gases presented herewith constitutes a considerable improvement over the known, and, thus, the subject invention makes a valuable contribution to the gas mixing art.

Alternatives to the above mention preferred embodiment of the invention will, of course, be readily appreciated by the artisan having the benefit of the teachings presented herein. For instance, electroacoustical transducer 23 and heater 21 (and their respective associated apparatus) may be excluded if so desired. Also, under some circumstances, where less operational efficiency can be tolerated, the refrigeration system may also be deleted.

Another simplified alternative is also possible, for example, in the situation where the two cylinders are filled with the desired quantities of water with the pistons in contact with the water surfaces thereof, and hydrogen and oxygen are admitted from high pressure sources to their respective cylinders until some desired high pressure is reached. In such case, the cooling system would be operational during this time, and the pistons would remain in contact with the water surfaces. With both cylinders at the same cutoff pressure, the water-gas solutions are mixed by transferring the water-oxygen solution to the water-hydrogen solution by activating the pistons in such manner as to effect such results, after which the mixed solutions are pushed directly to the storage bottles or other means thereby. When the mixed gas is needed, the water gas solution is vented from the storage bottles through a heat exchanger. While passing through the heat exchanger, added heat and reduced pressure permits the mixed gas to evolve from the water, or in the alternative, the water can be separated from the mixed gas by the force of gravity.

Obviously, other modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Apparatus for preparing a breathable mixture of hydrogen and oxygen gases in a predetermined ratio for use in deepsea diving, said apparatus comprising:

a first cylinder defining a first chamber holding a predetermined first volume of water;

a second cylinder defining a second chamber holding a second predetermined volume of water;

a first piston operable in said first cylinder for varying the volume of said first chamber between a chamber volume greater than said first volume of water and a lesser chamber volume equal to said first volume of water;

a second piston operable in said second cylinder for varying the volume of said second chamber between a chamber volume greater than said second volume of water and a lesser chamber volume equal to said second volume of water;

means for introducing a predetermined quantity of gaseous hydrogen into said first chamber while operating said first piston to vary the volume thereof from said lesser chamber volume to said greater chamber volume;

means for introducing a predetermined quantity of gaseous oxygen into said second chamber, in said predetermined ratio to said hydrogen in said first chamber, while operating said second piston to vary the volume thereof from said lesser chamber volume to said greater chamber volume;

piston drive means, coupled to said first and second pistons, for moving said pistons in said cylinders so as to reduce the volumes of said first and second chambers, respectively, to said lesser chamber volumes, whereby said hydrogen and said oxygen form first and second solutions with said first and second volumes of water, respectively;

refrigeration means, associated with said first and second cylinders, for cooling said water as said solutions are formed;

mixing means, connected to said first and second cylinders, for mixing said first and second solutions to form a third solution containing both said hydrogen and said oxygen in said predetermined ratio;

heating means, associated with one of said cylinders, for heating said third solution; and precipitator means, connected to said mixing means and said one of said cylinders, for separating said breathable mixture from said third solution.

2. Apparatus as defined in claim 1, and further comprising:

drier means and storage means, connected to said precipitator means, for drying and storing said gas mixture for later use.

3. Apparatus as defined in claim 2, and wherein said means for mixing comprises conduit and valve means adapted to interconnect said first and second chambers, whereby said first and second solutions can be mixed by operation of said pistons to move said first and second solutions between said chambers.

4. Apparatus as defined in claim 1, and further comprising:

control means, for automatically controlling the introduction of said hydrogen and oxygen, the operation of said pistons, said mixing means, and said heating means, in predetermined timed relation.

* * * * *